Dec. 5, 1967          D. J. ODDO          3,355,958

ENGINE LATHE GEAR BOX

Filed May 27, 1965          5 Sheets-Sheet 1

INVENTOR.
Donald J. Oddo,
BY
Wolfe, Hubbard, Voit & Osann
Attorneys.

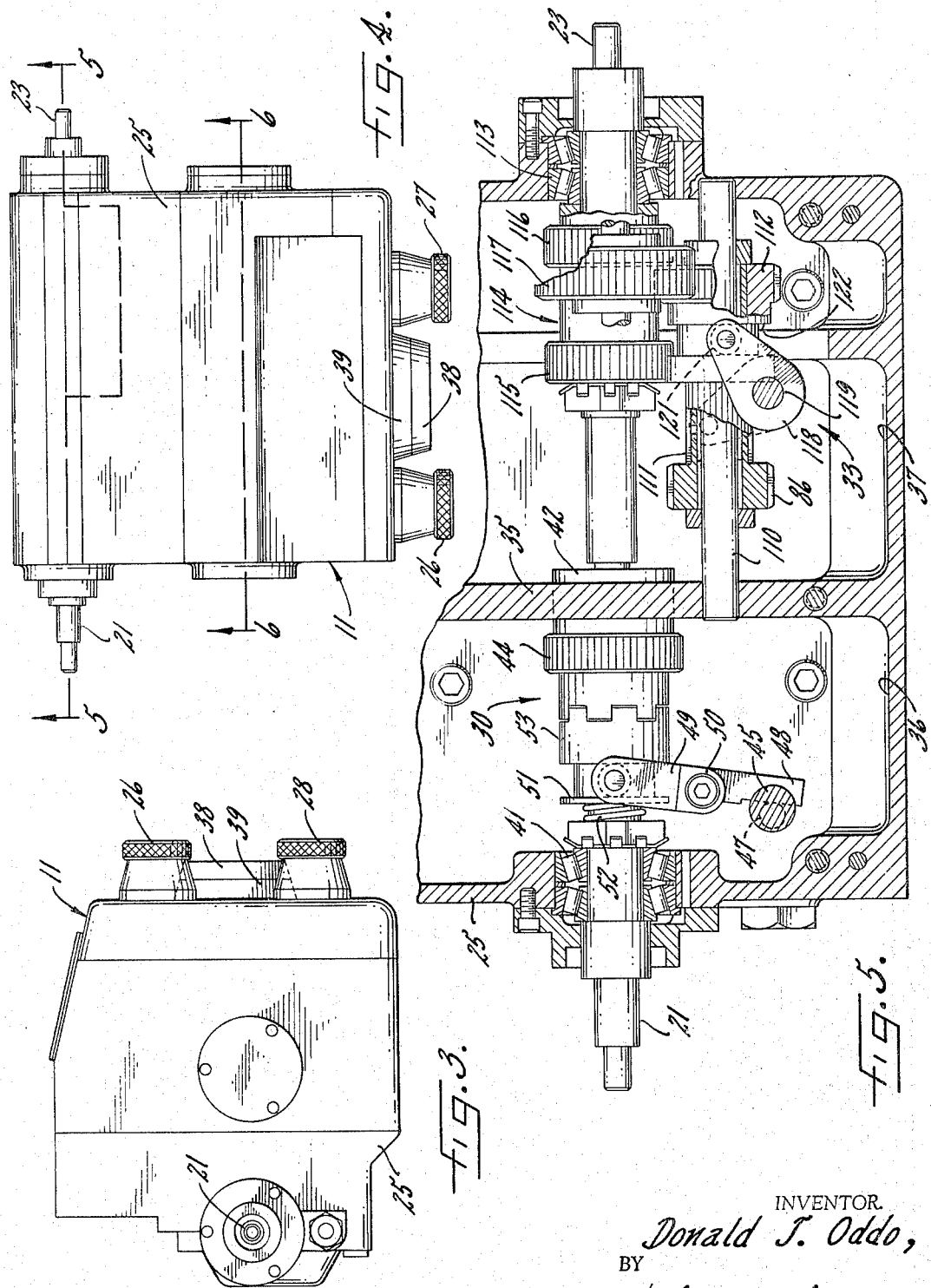

Dec. 5, 1967  D. J. ODDO  3,355,958

ENGINE LATHE GEAR BOX

Filed May 27, 1965  5 Sheets-Sheet 3

INVENTOR.
Donald J. Oddo,
BY
Wolfe, Hubbard, Voit & Osann
Attorneys.

INVENTOR.
Donald J. Oddo,
BY
Wolf, Hubbard, Voit & Osann
Attorneys.

INVENTOR.
Donald J. Oddo,
BY
Wolfe, Hubbard, Voit & Osann
Attorneys.

United States Patent Office 3,355,958
Patented Dec. 5, 1967

3,355,958
ENGINE LATHE GEAR BOX
Donald J. Oddo, Chicago, Ill., assignor to Sheldon Machine Company, Inc., Chicago, Ill., a corporation of Illinois
Filed May 27, 1965, Ser. No. 459,234
9 Claims. (Cl. 74—353)

ABSTRACT OF THE DISCLOSURE

An engine lathe gear box having a pair interconnected, multi-gear assemblies which can be selectively put into the driving train to give a wide range of feed screw speeds. Each gear assembly is rotatably mounted for shifting purposes, and the assemblies are coaxially alined to give a compact gear box.

This invention relates generally to machine tools and more particularly concerns a gear box for metal working engine lathes and similar tools.

An engine lathe conventionally includes a multi-speed transmission between the headstock spindle drive and the feed screw for the tool carriage, and the versatility of the lathe is partially dependent on the number of speed ratios provided. To insure accuracy in feed rates, such transmissions embody gears, and the problem of providing a shiftable gear transmission having many selectable ratios always confronts machine tool designers.

Accordingly, it is an object of the present invention to provide a lathe gear box having an exceptionally wide range of selectable speeds each with positive gear drive of the feed screw. In one practical embodiment, eighty speeds are available, proportioned between 1:4 and 1:960 drive ratios.

It is also an object to provide a gear box of the above character which is quite compact in view of the wide range of drive ratios available and which gives a straight-through drive, well suited for lathe applications.

A further object is to provide a gear box of the type described above that is economical to manufacture since the ratio changing gears are journalled in parallel relation and are arranged in only two major shiftable assemblies.

Another object is the provision of easily read, ratio indicating dials which are simply and economically coupled to the power transmitting gears so as to show the gear ratio being employed.

In more detail, it is an object to provide a gear box of the above kind which automatically declutches when the gears are shifted.

Other objects and advantages of the invention will become apparent upon reading the following detailed description and upon reference to the drawings, in which:

FIG. 3 is a side elevation of the gear box shown in FIG. 2;

FIG. 4 is a plan of the gear box shown in FIGS. 2 and 3;

FIG. 5 is a fragmentary enlarged section taken approximately along the line 5—5 in FIG. 4;

Figure 6:
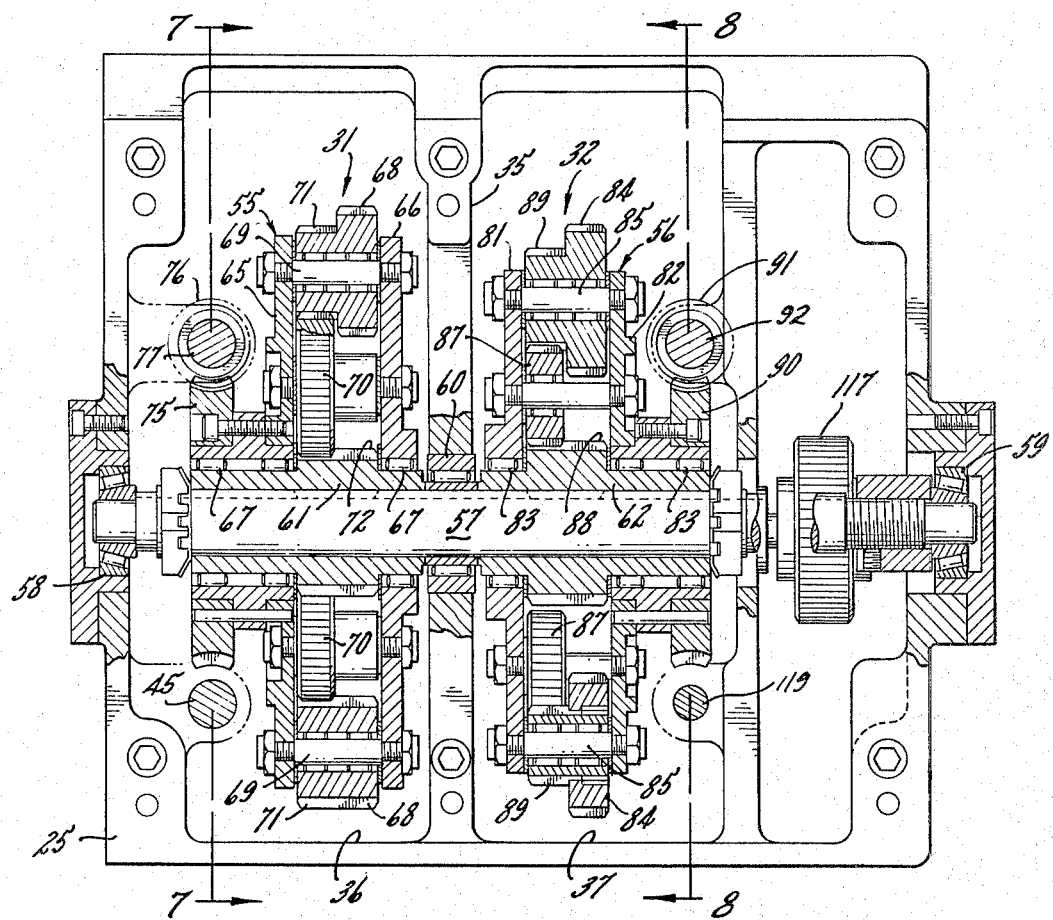
FIG. 6 is an enlarged section taken approximately along the line 6—6 in FIG. 4.
Figure 9:
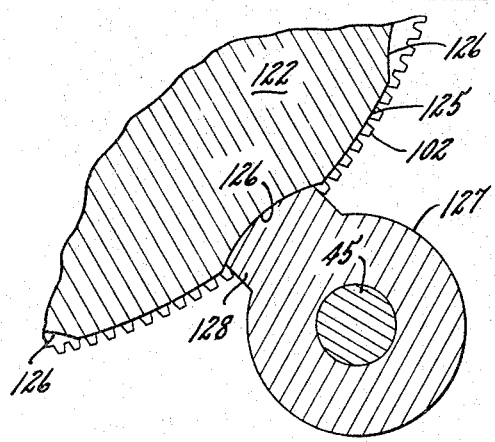
Figure 7:
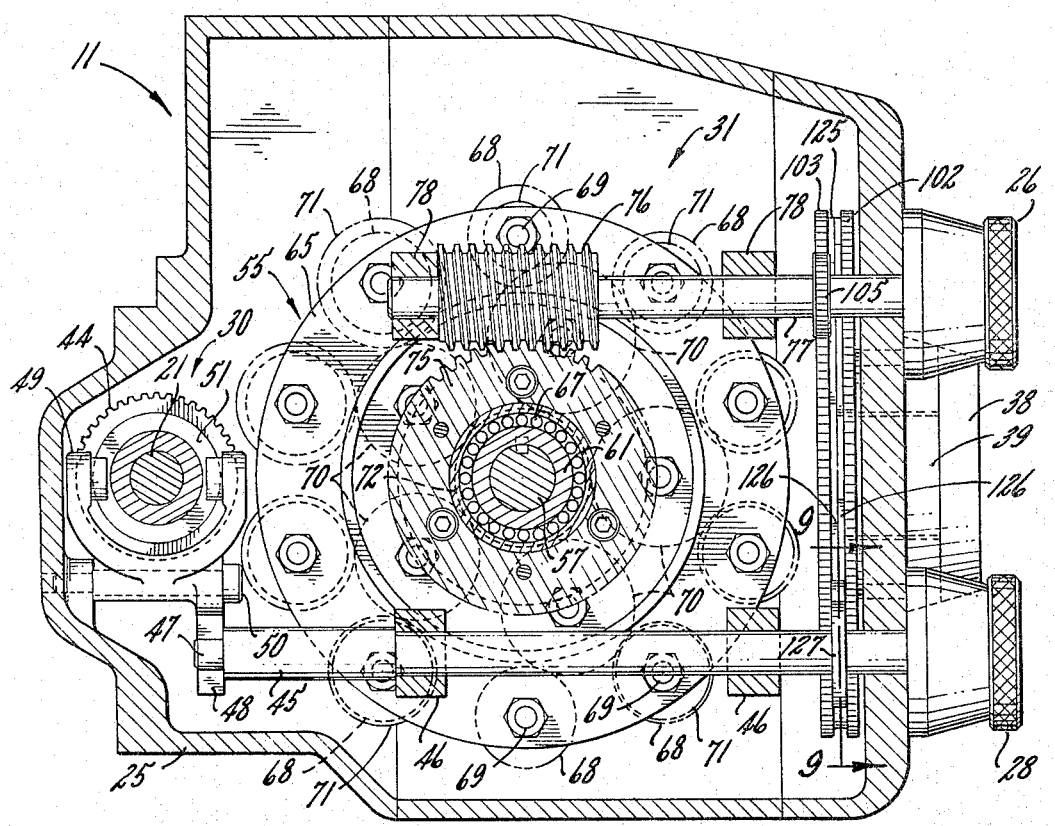
Figure 8:
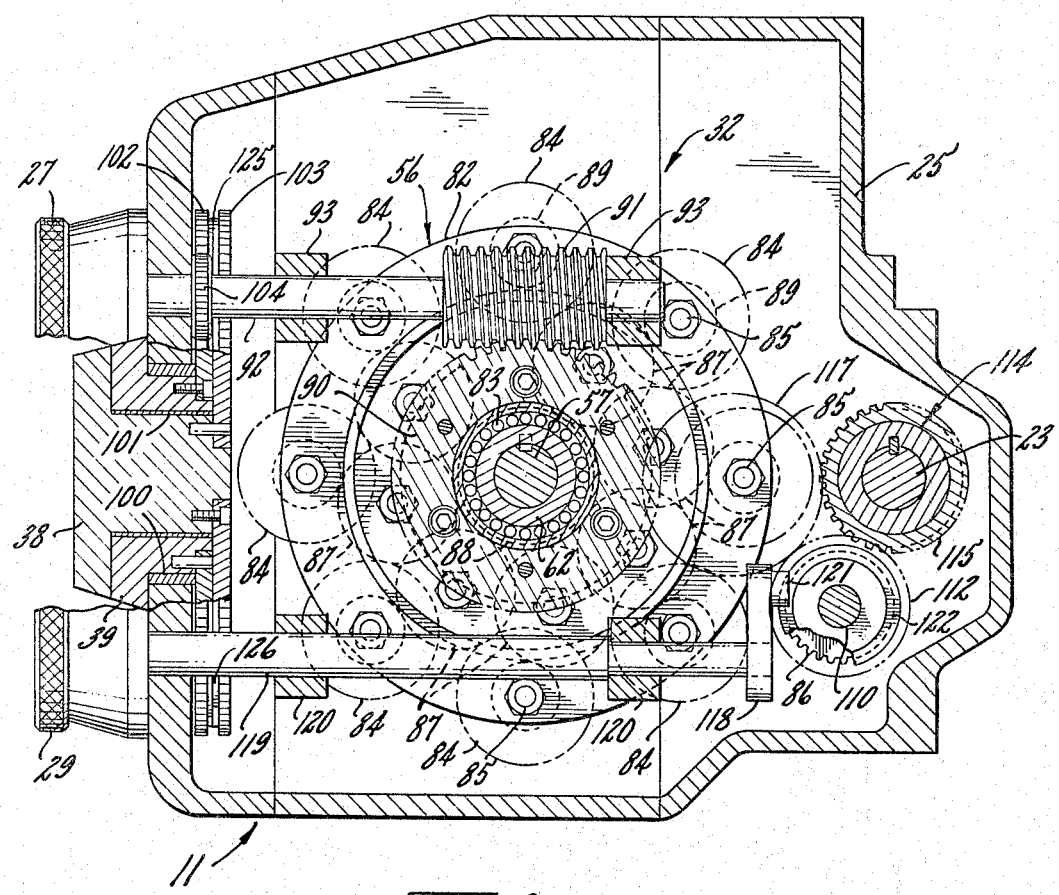

FIGS. 7 and 8 are sections taken along the respective lines 7—7 and 8—8 in FIG. 6; and FIG. 9 is a section taken approximately along the line 9—9 in FIG. 7.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
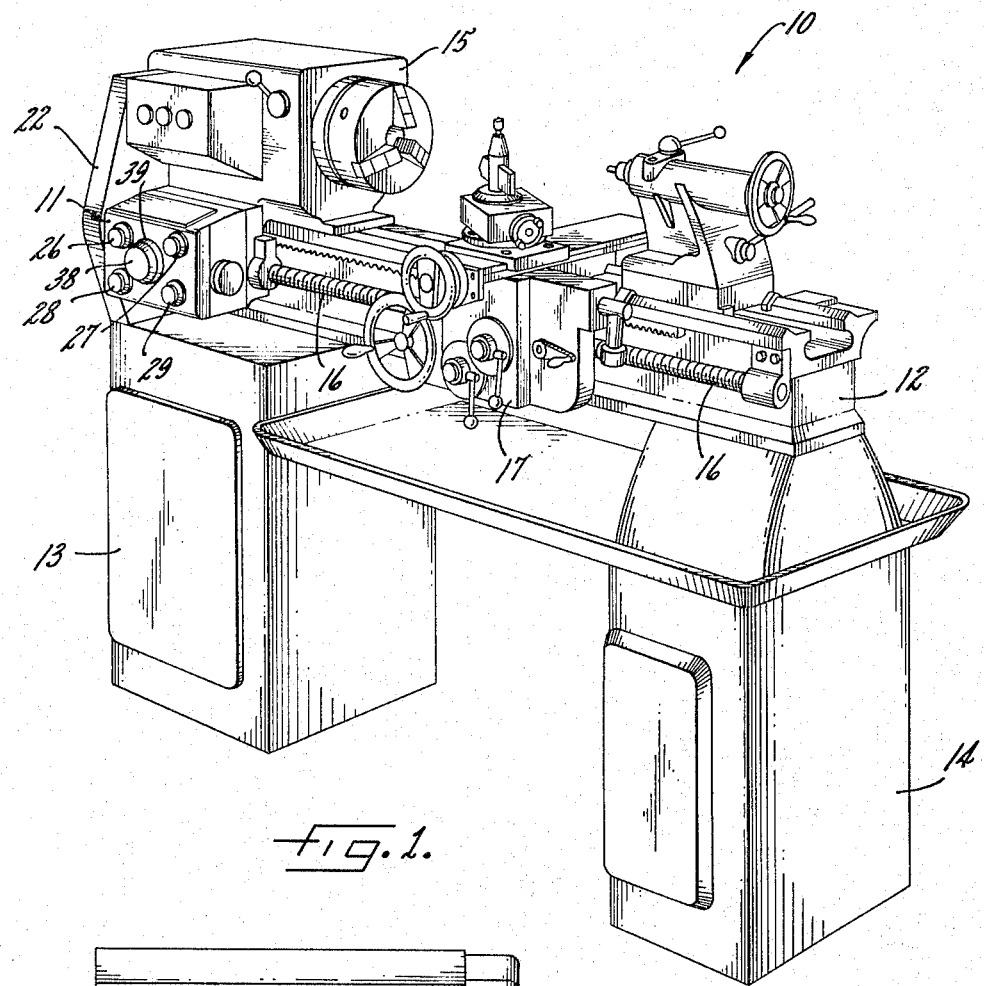
FIGURE 1 is a perspective of an engine lathe employing a gear box utilizing the present invention.

Turning first to FIG. 1, there is shown an engine lathe 10 including a gear box 11 embodying the invention. The lathe includes a bed 12 which spans and is supported by a base pedestal 13 and a leg 14. A headstock 15 is mounted at the end of the bed 12 above the pedestal 13 and the pedestal contains the usual motor and drive for the headstock. A feed screw 16 extends along the bed 12 from the gear box 11 and supplies power to a tool carriage 17 slidably mounted on the bed.

Figure 2:
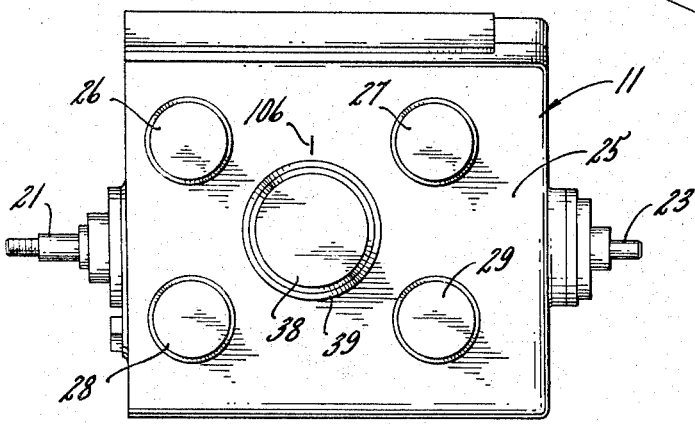
FIG. 2 is an enlarged fragmentary elevation showing the front of the gear box appearing in FIG. 1.

The gear box 11 is supported on the pedestal 13 and is provided at one side with a drive member 21 (see FIGS. 2–4) which extends into a housing 22 on the headstock 15 and is coupled by appropriate gearing, or through belts and pulleys, to the lathe motor within the pedestal 13, as will be well understood by those skilled in the art. The gear box 11 also includes an output element 23 which extends from the gear box oppositely to the drive member 21 and which is coupled directly to the feed screw 16.

Pursuant to the invention, the gear box 11 includes a housing 25 on which are rotatable operators in the form of manually turnable knobs 26, 27, 28 and 29. The knob 28 controls a clutch 30 (see FIG. 5) through which the drive member 21 supplies power to the gear box 11. The knobs 26, 27 control, respectively, ratio changing gear sets 31 and 32 (see FIG. 6) which regulate the gear ratio between the drive member 21 and the output element 23. The knob 29 controls reversing gears 33 (see FIG. 5) permitting the direction in which the feed screw 16 is rotated to be selected. Preferably, the housing 25 is formed with a center wall 35 which divides the housing into two chambers 36 and 37. The clutch 30 and the gear set 31 are in the chamber 36, and the gear set 32 and the reversing gears 33 are in the chamber 37.

Returning to the external appearance of the gear box 11, a pair of dial members 38 and 39 are positioned in the approximate center of the front face of the housing and these dials bear indicia indicating the setting of the ratio determining gear sets 31, 32.

The clutch 30 is preferably a jaw type and is formed coaxially with a shaft that defines the drive member 21 and which is journalled in bearings 41 and 42 mounted in the housing 25 (see FIG. 5). The clutch 30 includes an axially shiftable jaw 43 splined on the drive member shaft 21 and formed with lugs which mesh with lugs formed on an input gear 44 that is journalled on the shaft 21 adjacent the wall 35. The clutch controlling knob 28 is secured to a shaft 45 which is rotatably mounted in lugs 46 preferably formed integrally within the housing 25 (see FIG. 7). An eccentric end pin 47 on the shaft 45 abuts a finger 48 on a yoke 49 that is journalled on a pin 50 within a housing 25 adjacent the jaw 43. The yoke is provided with rollers which are received within a groove 51 formed in the jaw 43 so that oscillation of the yoke shifts the jaw 43 toward and away from the mating lugs on the gear 44. Preferably, a spring 52 bears against the jaw 43 and holds the finger 48 against the eccentric pin 47.

It can thus be seen that rotation of the knob 28 one-half revolution is effective to shift the eccentric pin 47 from its clutch engaged position, shown in FIGS. 5 and 7, to the right in FIG. 5 so as to swing the yoke 49 counterclockwise, whereby the jaw 43 is pulled away from the gear 44 disengaging the interfitted lugs and opening the clutch 30. Another half turn of the knob 28 returns the parts to their illustrated positions and closes the clutch.

In carrying out the invention, the gear sets 31, 32 include annular cages 55 and 56, respectively, which carry closely spaced, peripherally arranged gears and pinions and which are fitted coaxially about a common shaft 57 in the respective housing chambers 36, 37 (see FIG. 6). The shaft 57 is journalled within the housing 25 in opposed tapered bearings 58 and 59 and is further supported at its center portion by a bearing 60 fitted in the wall 35. The shaft 57 carries sleeves 61 and 62 keyed thereto within the respective chambers 36, 37 and forming enlargements of the shaft 57 on which the gear sets 31, 32 are mounted.

Turning first to the gear set 31 (see FIGS. 6 and 7), the cage 55 is formed by rigidly interconnected circular plates 65 and 66 which are rotatably mounted by a bearing 67 on the sleeve 61. A plurality of pinions 68 are journalled about the periphery of the cage 55 on shafts 69 which are mounted parallel to the axis of the shaft 57. The shafts 69 are positioned so that alternate ones of the pinions 68 mesh with the input gear 41 upon rotation of the cage 55. The pinions 68 are individually coupled to the shaft 57 by a plurality of idler gears 70 and gear portions 71 on the pinions 68, with the idler gears 70 and the gear portions 71 being of differing diameter for each of the pinions 68 so that different driving ratios are established between each of the pinions and the shaft 57.

In the preferred embodiment, there are ten pinions 68 spaced peripherally about the cage 55, each having twenty-four teeth. Five idler gears 70 are provided, each meshing with gear portions 71 formed on two adjacent ones of the pinions 68. The number of teeth on the gear portions 71 ranges from sixteen to thirty, with one or two tooth differences between adjacent ones of the pinions 68. The idler gears 70 are appropriately proportioned for meshing with the gear portions 71 and, in the practical embodiment under discussion, the number of their teeth ranges from twenty-nine to thirty-five. To establish the driving connection between the idlers 70 and the shaft 57, the sleeve 61 is formed with a gear portion 72 having, in the practical embodiment being considered, thirty-two teeth. Thus, a plurality of regularly varying gear ratios is established between the individual ones of the pinions 68 and the shaft 57.

For rotating the cage 55 to bring alternate ones of the pinions 68 into mesh with the input gear 44, a worm gear 75 is secured to the cage 55 and engaged by a worm 76 on a shaft 77. The shaft 77 is journalled in lugs 78 formed in the housing 25 and extends outwardly of the housing to support the knob 26. It can thus be seen that rotation of the knob 26 rotates the shaft 77 and the worm 76 so as to rotate the worm gear 75 and thus the cage 55. By rotating the cage 55 through a full 360°, any one of the pinions 68 may be brought into meshing engagement with the input gear 44.

Turning to the gear set 32 and FIGS. 6 and 8, the cage 56 is also formed of rigidly interconnected circular plates 81 and 82 which are rotatably mounted by bearings 83 on the sleeve 62 that is keyed to the shaft 57. A plurality of pinions 84 are journalled about the periphery of the cage 56 on shafts 85 which are disposed parallel to the axis of the shaft 57. The shafts 85 are positioned so that alternate ones of the pinions 84 can be brought into mesh with an output gear 86 (see also FIG. 5) upon rotation of the cage 56.

The pinions 84 are rotatably coupled to the shaft 57, and each pinion to its adjacent pinion, by idler gears 87 so as to establish a continuous gear train extending about periphery of the cage 56. In the preferred embodiment, there are eight pinions 84 each interconnected to its adjacent pinion by one of seven idler gears 87. an eighth idler gear 87 is disposed between one of the end pinions 84 in the series and a toothed portion 88 formed on the sleeve 62. The idler gears 87 are meshed between the peripheries of the pinions 84 and reduced diameter tooth portions 89 formed integrally with the adjacent pinions 84. The resulting gear train, as seen in FIG. 8, thus extends from the tooth portion 88 of the sleeve 62 to the uppermost one of the pinions 84, and from there clockwise about the periphery of the cage 56. The idler gears 87, acting between the reduced portions 89 and the adjacent ones of the pinions 84, drives each clockwise-adjacent pinion at a slightly higher speed. Thus, bringing alternate ones of the pinions 84 into mesh with the output gear 86 establishes differing driving ratios between the shaft 57 and the output gear.

For rotating the cage 56 to bring alternate ones of the pinions 84 into mesh with the output gear, a worm gear 90 is secured to the cage 56 and engaged by a worm 91 that is secured to a shaft 92 journalled in lugs 93 formed within the housing 25. The shaft 92 extends outwardly of the housing to support the control knob 27 and it can therefore be seen that rotation of the control knob rotates the worm 91 and turns the cage 56, thereby allowing the operator to bring alternate ones of the pinions 84 into engagement with the output gear 86.

It will be appreciated that the gear sets 31, 32 are disposed in series between the input gear 44 and the output gear 86. That is, the input gear 44 drives the shaft 57 through the gear set 31, and the shaft 57 drives the output gear 86 through the gear set 32. Because there are ten pinions 68 in the gear set 31 and eight pinions 84 in the gear set 32, a total of eighty different gear ratios is provided in the exemplary embodiment and thus a very wide range of speed ratios varying from between 1:4 and 1:960 is obtained in this construction. Considering this range and versatility, the gear box is quite small and compact, as will be best appreciated by those familiar with this art.

To enable the operator of the lathe 10 to rotate the gear set cages 55, 56 to the proper points to establish a desired ratio, the dial members 38, 39 are mounted for rotation in the housing 25 and are interconnected to the gear set cages. As best seen in FIG. 8, the dial members 38, 39 are concentrically mounted for independent rotation within a sleeve bearing 100, and a second sleeve bearing 101 is interposed between the dials. A gear wheel 102 is secured to the dial member 39, and a second gear wheel 103 is secured to the dial member 38. A pinion 104 on the shaft 92 is positioned in meshing engagement with the gear wheel 102, and a second pinion 105 is secured to the shaft 77 in meshing engagement with the gear wheel 103. Thus, rotation of the control knob 27 to set the gear set cage 56 also rotates the gear wheel 102, and hence the dial member 39. Similarly, rotation of the knob 26 to position the gear set 31 rotates the gear wheel 103 and the dial member 38. The peripheral portions of the dial members 38, 39 are inscribed with suitable indicia which, when lined up with a mark 106 formed on the housing (see FIG. 2), indicates to the operator the setting of the gear set cages 55, 56, and thus a desired gear ratio can be quickly established by appropriate rotation of the knobs 26, 27.

The output gear 86 drives the output element 23 of the gear box 11 through the reversing gears 33. For this purpose, the output gear 86 is journalled on a lay shaft 110 fixed in the outer wall of the housing 25 and the central wall 35 (see FIG. 5). The output gear 86 is formed with a splined portion 111 which slidably and nonrotatably, carries a shiftable gear 112. The output element 23 takes the form of a shaft journalled in the bearing 42 and in a bearing 113 mounted in the end wall of the housing 25. A double gear 114, formed with teeth 115 and 116 is keyed to the output element shaft 23. A reverse gear 117 is journalled parallel to the gear 114 in meshing engagement with the gear teeth 116 (see also FIGS. 6 and 8). With the shiftable gear 112 in its illustrated solid line position, it is in meshing engagement with the reverse gear 117 and thus the power train extends from the output gear 86 through the gear 112, the reverse gear 117, and the teeth 116 on the double gear 114, so as to drive the output element shaft 23 in one direction. Shifting the gear 112 to the left as seen in FIG. 5 moves the gear through a neutral position to a point where the gear 112 meshes with the teeth 115 of the double gear 114. A drive is thus established from the output gear 86 through the gear 112 to the teeth 115 on the double gear 114 that is effective to drive the output element shaft 23 in the opposite direction. If desired, the clutch 30 can be eliminated and the neutral position of the reversing gears 33 used for interrupting drive through the box 11.

The knob 29 operates the reversing gears 33 by means of a crank 118 secured on a shaft 119 that is journalled in lugs 120 formed within the housing 25 and which extends outwardly of the housing to support the knob 29. The crank 118 carries a pin 121 which fits within a groove 122 formed in the shiftable gear 112 so that oscillation of the shaft 119, caused by rotational movement of the knob 29, swings the crank 118 between its solid and dashed line positions shown in FIG. 5 and thus slides the gear 112 between its operating positions.

For insuring opening of the clutch 30 prior to and whenever the gear sets 31, 32 are shifted, the gear wheels 102, 103 are formed with abutting peripheral flanges 125 having peripherally spaced cam depressions 126. The cam depressions 126 come into alignment adjacent the clutch operating shaft 45 only when the knobs 26 and 27 have rotated the gear set cages 55, 56 so that their pinions are in meshing engagement, respectively, with the input and output gears 44 and 86. There are, therefore, eight depressions 126 formed in the flange 125 on the gear wheel 122 so that there is a depression 126 corresponding to each one of the pinions 84 in the gear set 32. One of these depressions 126 on the gear wheel 102 comes immediately adjacent the shaft 45 whenever one of the pinions 84 is in proper mesh with the output gear 86. Similarly, there are ten depressions 126 on the flange 125 of the gear wheel 103 so that each one of these depressions 126 corresponds to one of the pinions 68 in the gear set 31. These depressions are adjacent the shaft 45 whenever one of the pinions 68 is in proper meshing engagement with the input gear 44.

A cam 127 having a lobe 128 is mounted on the clutch control shaft 45 so that the lobe 128 can be received within the depressions 126 when the depressions are aligned and adjacent the shaft 45 (see FIGS. 7 and 9). The cam 127 is angularly disposed on the shaft 45 so that, when in the solid line position illustrated in FIG. 9, the clutch 30 is closed. Thus, rotation of either one of the gear wheels 102, 103 causes the respective one of the depressions 126 to move away from the shaft 45, thus kicking the cam lobe 128 either clockwise or counterclockwise and, in either event, rotating the shaft 45 so as to open the clutch 30 through the yoke 49 as previously explained. In this way, rotation of either one of the knobs 26, 27 to effect a change in the setting of the gear sets 31, 32 also, through rotation of the corresponding one of the gear wheels 102, 103 causes the cam 127 to rotate the clutch control shaft 45 and open the clutch. Once the desired gear setting has been obtained, the operator returns the knob 28 to the clutch engaged position which, assuming the gear sets 31, 32 have been properly disposed, is permitted by the lobe 128 of the cam 127 being received within an alternate pair of the depressions 126.

It can thus be seen that the lathe 10 is provided with an exceptionally wide range of selectable speeds for the carriage feed screw, each with positive gear drive of the feed screw. The gear box 11 is quite compact in view of the wide range of drive ratios available and, to further simplify lathe design, it will be noted that the drive member 21 of the gear box is axially aligned with the output element 23 so that a straight-through drive is achieved.

An even more compact gear box can be provided by rotating the gear sets 31, 32 and their common shaft 57 ninety degrees since the circular gear sets would not then project forwardly from the lathe. In such a case, helical gearing would couple the input and output gears 44, 86 with the drive member 21 and the output element 23, respectively, and ordinary spur gears would replace the worms 76, 91 and worms gears 75, 90. In other words, the invention is not dependent on the angular disposition of the gear sets 31, 32 within the housing 25.

I claim as my invention:

1. In an engine lathe having an elongated feed screw and an axially spaced drive member, a gear box for transmitting power from said drive member to said feed screw, comprising, in combination, a housing, gearing in said housing including a pair of ratio changing assemblies, a clutch in said housing for selectively coupling said drive member to said gearing, reversing gears in said housing for coupling said gearing to said feed screw in either forward or reverse drive, means including a first rotatable operator extending from said housing for operating said clutch, means including second and third rotatable operators extending from said housing for selectively setting each of said assemblies independently, and means including a fourth rotatable operator extending from said housing for operating said reversing gears.

2. In an engine lathe having an elongated feed screw and an axially spaced drive member, a gear box for transmitting power from said drive member to said feed screw comprising, in combination, a housing, a shaft journalled in said housing, a first annular cage rotatably mounted within said housing coaxially about said shaft, a first plurality of pinions journalled about the periphery of said first cage on axes parallel to the axis of said shaft, means including teeth on said shaft and a plurality of idler gears journalled on said first cage for rotatably coupling one of said first pinions to said shaft and each pinion to the adjacent pinion so as to establish a continuous gear train extending about the periphery of said cage, a first gear journalled in said housing parallel to and adjacent said first cage so as to mesh with alternate ones of said first pinions upon rotation of said first cage, a second annular cage rotatably mounted within said housing coaxially about said shaft, a second plurality of pinions journalled about the periphery of said second cage on axes parallel to the axis of said shaft, means including teeth on said shaft and idler gears journalled on said second cage for establishing different driving ratios between each of said second pinions and said shaft, a second gear journalled in said housing parallel to and adjacent said second cage so as to mesh with alternate ones of said second pinions upon rotation of said cage, and means for selectively rotating said cages for establishing different driving ratios between said first and said second gears.

3. In an engine lathe having an elongated feed screw and an axially spaced drive member, a gear box for transmitting power from said drive member to said feed screw, comprising, in combination, a housing, gearing in said housing including a pair of ratio changing assemblies, a clutch in said housing for selectively coupling said drive member to said gearing, reversing gears in said housing for coupling said gearing to said feed screw in either forward or reverse drive, means including a first rotatable operator extending from said housing for operating said clutch, means including second and third rotatable operators extending from said housing for selectively setting each of said assemblies independently, means including a fourth rotatable operator extending from said housing for operating said reversing gears, and means for rotating said first operator to open said clutch upon initial rotation of either of said second or third operators.

4. In an engine lathe having an elongated feed screw and an axially spaced drive member, a gear box for transmitting power from said drive member to said feed screw comprising, in combination, a housing, a shaft journalled in said housing, an annular cage rotatably mounted within said housing coaxially about said shaft, a plurality of pinions journalled about the periphery of said cage on axes parallel to the axis of said shaft means including teeth on said shaft and idler gears journalled on said cage for establishing different driving ratios between each of said pinions and said shaft, a gear journalled in said housing parallel to and adjacent said cage so as to mesh with alternate ones of said pinions upon rotation of said cage, means for rotating said cage for establishing different driving ratios between said gear and said shaft, means including a clutch coupling said drive member to said gear, a clutch operating element shiftably mounted in said housing, means for manually shifting said element and operating said clutch, and means linking said cage and said element for opening said clutch upon rotation of said cage.

5. In an engine lathe having an elongated feed screw and an axially spaced drive member, a gear box for transmitting power from said drive member to said feed screw comprising, in combination, a housing, a shaft journalled in said housing, an annular cage rotatably mounted within said housing coaxially about said shaft, a plurality of pinions journalled about the periphery of said cage on axes parallel to the axis of said shaft, means including teeth on said shaft and a plurality of idler gears journalled on said cage for rotatably coupling one of said pinions to said shaft and each pinion to the adjacent pinion so as to establish a continuous gear train extending about the periphery of said cage, a gear journalled in said housing parallel to and adjacent said cage so as to mesh with alternate ones of said pinions upon rotation of said cage, means for rotating said cage for establishing different driving ratios between said shaft and said gear, means including a clutch coupling said drive member to said gear, a clutch operating element shiftably mounted in said housing, means for manually shifting said element and operating said clutch, and means linking said cage and said element for opening said clutch upon rotation of said cage.

6. In an engine lathe having an elongated feed screw and an axially spaced drive member, a gear box for transmitting power from said drive member to said feed screw, comprising, in combination, a housing, gearing in said housing including a pair of ratio changing assemblies, a clutch in said housing for selectively coupling said drive member to said gearing, reversing gears in said housing for coupling said gearing to said feed screw in either forward or reverse drive, means including a first rotatable operator extending from said housing for operating said clutch, means including second and third rotatable operators extending from said housing for selectively setting each of said assemblies independently, means including a fourth rotatable operator extending from said housing for operating said reversing gears, a pair of coaxial adjacent gears journalled in said housing, said second operator being rotatably coupled to one of said gears and said third operator being rotatably coupled to the other of said gears, said pair of gears having peripherally spaced cam depressions which come into alignment only when said second and third operators have rotated said elements into meshing engagement, a cam on said first operator positioned to be received in said depressions when aligned and said clutch is closed, whereby rotation of either said second or third operators to change the gearing ratio moves the depressions out of alignment and thus rotates the cam and the first operator to open said clutch.

7. In an engine lathe having an elongated feed screw and an axially spaced drive member, a gear box for transmitting power from said drive member to said feed screw, comprising, in combination, a housing, gearing in said housing including a pair of ratio changing assemblies, reversing gears in said housing for coupling said gearing to said feed screw in either forward or reverse drive, means including a first rotatable operator extending from said housing for operating said reversing gears, means including second and third rotatable operators extending from said housing for selectively setting each of said assemblies independently, a pair of dials journalled concentrically on said housing, means coupling said second and third operators to said dials so that rotation of the latter display the setting of said assemblies.

8. In an engine lathe having an elongated feed screw and an axially spaced drive member, a gear box for transmitting power from said drive member to said feed screw comprising, in combination, a housing, a shaft journalled in said housing, an annular cage rotatably mounted within said housing coaxially about said shaft, a plurality of pinions journalled about the periphery of said cage on axes parallel to the axis of said shaft, means including teeth on said shaft and idler gears journalled on said cage for establishing different driving ratios between each of said pinions and said shaft, a gear journalled in said housing parallel to and adjacent said cage so as to mesh with alternate ones of said pinions upon rotation of said cage, means for rotating said cage for establishing different driving ratios between said gear and said shaft, a positioning gear secured to said cage, a setting gear journalled in said housing in meshing engagement with said positioning gear, an operator for manually rotating said setting gear from the exterior of said housing, and means rotatably coupled to said setting gear for displaying the angular position of said cage and hence the gear ratio established between said gear and said shaft.

9. In an engine lathe having an elongated feed screw and an axially spaced drive member, a gear box for transmitting power from said drive member to said feed screw comprising, in combination, a housing, a shaft journalled in said housing, an annular cage rotatably mounted within said housing coaxially about said shaft, a plurality of pinions journalled about the periphery of said cage on axes parallel to the axis of said shaft, means including teeth on said shaft and a plurality of idler gears journalled on said cage for rotatably coupling one of said pinions to said shaft and each pinion to the adjacent pinion so as to establish a continuous gear train extending about the periphery of said cage, a gear journalled in said housing parallel to and adjacent said cage so as to mesh with alternate ones of said pinions upon rotation of said cage, means for rotating said cage for establishing different driving ratios between said shaft and said gear, a positioning gear secured to said cage, a setting gear journalled in said housing in meshing engagement with said positioning gear, an operator for manually rotating said setting gear from the exterior of said housing, and means rotatably coupled to said setting gear for displaying the angular position of said cage and hence the gear ratio established between said gear and said shaft.

References Cited
UNITED STATES PATENTS

| | | | |
|---|---|---|---|
| 812,888 | 2/1906 | Shannon | 74—353 |
| 3,232,171 | 2/1966 | Hengehold | 74—353 |
| 3,273,414 | 9/1966 | Boggs | 74—353 |

DONLEY J. STOCKING, *Primary Examiner.*

H. S. LAYTON, *Assistant Examiner.*